United States Patent
Bahorich et al.

(10) Patent No.: US 6,823,262 B2
(45) Date of Patent: Nov. 23, 2004

(54) METHOD FOR CONDUCTING SEISMIC SURVEYS UTILIZING AN AIRCRAFT DEPLOYED SEISMIC SOURCE

(75) Inventors: Phillip Andrew Bahorich, Huntington Beach, CA (US); Michael Stephen Bahorich, Houston, TX (US)

(73) Assignee: Apache Corporation, Houston, TX (US)

( * ) Notice: Subject to any disclaimer, the term of this patent is extended or adjusted under 35 U.S.C. 154(b) by 0 days.

(21) Appl. No.: 10/101,808

(22) Filed: Mar. 18, 2002

(65) Prior Publication Data

US 2002/0163857 A1 Nov. 7, 2002

Related U.S. Application Data

(63) Continuation-in-part of application No. 09/399,896, filed on Sep. 21, 1999, now abandoned.

(51) Int. Cl.[7] ............................................... G01V 1/04
(52) U.S. Cl. .......................................... 702/1; 181/114
(58) Field of Search .......................... 367/14, 131, 4, 367/199, 99, 37, 0.37; 702/1; 181/116, 0.5, 121, 114; 73/15.5; 348/139

(56) References Cited

U.S. PATENT DOCUMENTS

| | | | |
|---|---|---|---|
| 3,509,960 A | * 5/1970 | Hamilton | 181/0.5 |
| 3,514,749 A | 5/1970 | Padberg, Jr. | 340/15.5 |
| 3,542,151 A | 11/1970 | Hamilton | 181/0.5 |
| 3,555,502 A | 1/1971 | Davis, Jr. et al. | 340/15.5 |
| 3,685,608 A | 8/1972 | Hamilton | 181/0.5 |
| 3,704,764 A | 12/1972 | Henderson | 181/0.5 |
| 3,724,374 A | * 4/1973 | Somerville et al. | 181/116 |
| 3,944,964 A | * 3/1976 | Loeser et al. | 367/4 |
| 4,011,924 A | 3/1977 | Barbier | 181/121 |
| 4,124,090 A | 11/1978 | Reynolds et al. | 181/121 |
| 4,223,759 A | 9/1980 | Martin | 181/116 |
| 4,317,501 A | 3/1982 | Gleize | 181/121 |
| 4,408,677 A | 10/1983 | Roy | 181/121 |
| 4,421,198 A | 12/1983 | Miller | 181/121 |
| 4,583,095 A | 4/1986 | Peterson | 343/0.5 |
| 4,975,890 A | * 12/1990 | Wolf et al. | 367/131 |
| 5,681,982 A | 10/1997 | Stoll et al. | 73/12.13 |
| 6,055,214 A | 4/2000 | Wilk | 367/99 |
| 6,220,168 B1 | 4/2001 | Woodall et al. | 102/411 |

OTHER PUBLICATIONS

Phillipe De Heering and Peter Sutcliffe and Mike Desparois; "Non–Contact Through–the–Ice Sounding of Arctic Waters (Telesondage des Mers Arctiques)"; Signal Et Ses Applications; May 20–24, 1985; p. 967–972; Canadian Astronautics Limited.

* cited by examiner

Primary Examiner—John Barlow
Assistant Examiner—Victor J. Taylor

(57) ABSTRACT

The invention comprises the generation of seismic signals at a survey site at which seismic sensors are deployed by dropping mass units from an overflying aircraft. The mass units will impact the earth's surface at said survey site to generate seismic signals. The seismic sensors are utilized to detect the resulting seismic signals.

30 Claims, 5 Drawing Sheets

METHOD FOR CONDUCTING SEISMIC SURVEYS UTILIZING AN AIRCRAFT DEPLOYED SEISMIC SOURCE

CROSS REFERENCE TO RELATED APPLICATIONS

This application is a Continuation-In-Part Application of U.S. patent application Ser. No. 09/399,896, having a filing date of Sep. 21, 1999 ABN, titled "Method for Conducting Seismic Surveys Utilizing an Aircraft Deployed Seismic Source", and was copending therewith.

BACKGROUND OF THE INVENTION

1. Field of the Invention

This invention relates generally to geophysical exploration. More particularly, the invention relates to a novel method for generating a seismic signal.

2. Description of the Prior Art

Reflection seismology is a well-known technique for prospecting for subsurface oil and gas reservoirs, both on land and in marine environments. A seismic source is utilized to generate acoustic waves, normally at or near the earth's surface, and these waves travel downwardly into the earth's subsurface. A portion of the seismic wave energy is reflected or refracted from the subsurface interfaces between earth strata having different acoustic velocities, and this reflected or refracted energy is then detected by sensors which are normally deployed at the earth's surface. The detected signals are normally recorded for later signal processing. The travel time of the seismic signal from the seismic source location down to various subsurface interfaces is determined and this travel time along with a velocity profile of the earth's subsurface are utilized to determine the subsurface location of these reflecting interfaces. The velocity profile may be determined from the seismic data or it may have been predetermined. Subsurface acoustically reflecting interfaces often correspond to the location of an oil and gas reservoir.

A wide variety of sources have been used, including dynamite, mechanical impact sources and seismic vibrator sources. A wide variety of impact sources are known, including by way of example, but not limited to, those described in U.S. Pat. Nos. 4,124,090; 4,421,198 and 4,011,924.

The prior art shows certain uses of aircraft in geophysical exploration. It is known, for example, to conduct electromagnetic and gravity surveys with overflying aircraft carrying electromagnetic and gravity sensing instruments. It has also been proposed, in U.S. Pat. No. 4,223,759, to transport seismic sensors to a survey site by means of an aircraft and to drop the sensors to the earth's surface as the aircraft overflies the survey site.

There has been a long felt need for a system for conducting seismic exploration that reduces the impact on environmentally sensitive areas such as the arctic region and land-marine transition zones. There are also regions, such as the marine-land transition zones and mountainous regions, that are difficult to traverse with a transport vehicle. Accordingly, it is an object of this invention to generate a seismic signal without requiring surface transportation of the means for creating the seismic signal to the location where the signal is to be generated.

SUMMARY OF THE INVENTION

In an embodiment of the invention, a seismic signal is generated at a survey site by dropping a mass from an overflying aircraft so that the mass will impact the earth's surface at the survey site. Seismic sensors are deployed within the survey site to detect seismic signals resulting from the impact of the mass on the earth's surface.

DETAILED DESCRIPTION OF THE PREFERRED EMBODIMENT

Figure 1:
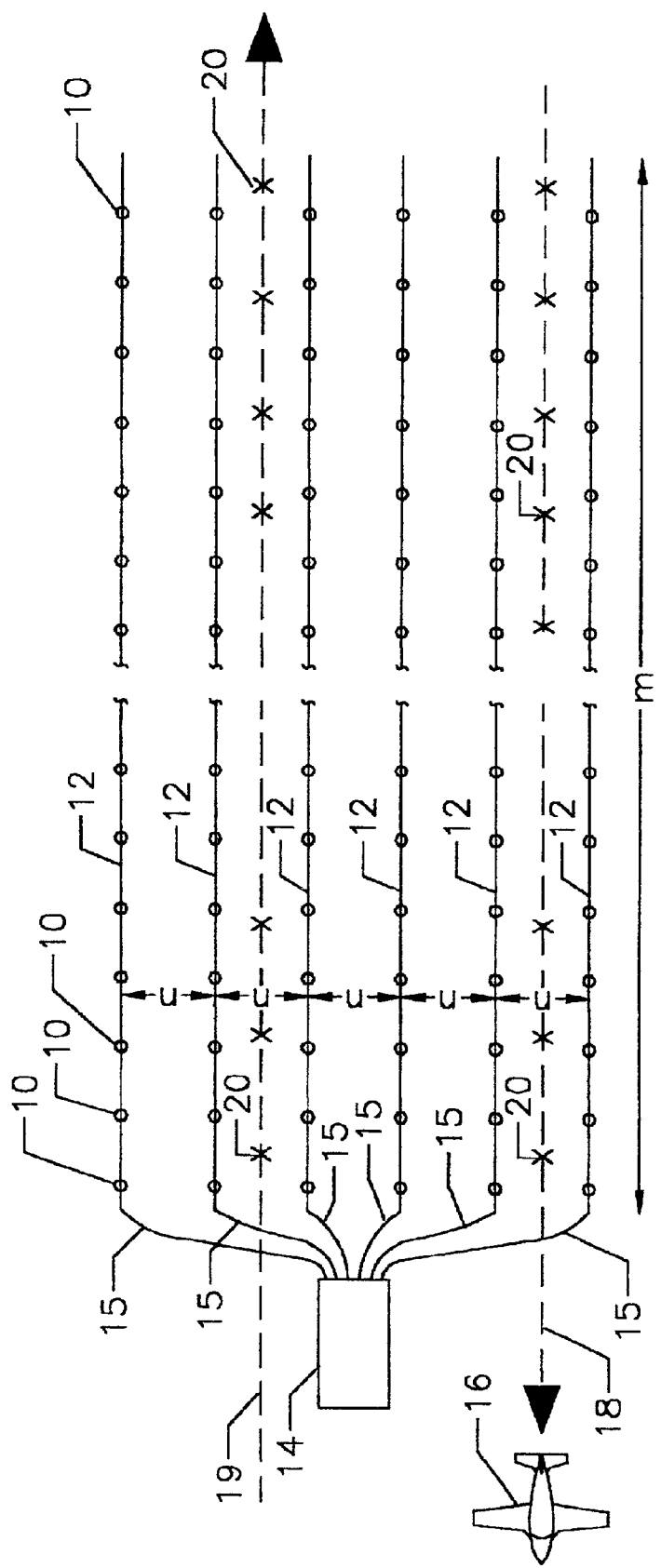
FIG. 1 shows a system layout useful for practicing the invention.

FIG. 1 shows a plan view of a portion of a survey site according to an embodiment of the invention. As shown in FIG. 1, multiple lines 12 of seismic receiver stations 10 are deployed in the survey area. Each receiver station 10 is of the conventional type for receiving the seismic energy of interest, and as such may consist of a single receiver, but may preferably include multiple receivers. Multiple receivers associated with a receiver station 10 may be located near the same point, but each receiver station may also include multiple receivers spread out in an array, but interconnected to generate one composite signal.

The types of receivers included within receiver stations 10 will be determined according to the type of seismic energy to be detected. Examples of conventional receivers useful in this embodiment of the invention include conventional geophones, which detect energy in the form of velocity. Conventional geophones may be configured to detect compressional, horizontal shear or vertical shear energy. Further, a single geophone installation may included multi-component geophones for detecting energy in each of the three orthogonal directions.

Alternatively, for receivers deployed under water, receiver stations 10 may be conventional hydrophones. As is well known, hydrophones detect seismic energy transmitted as pressure, without a directional indication. For underwater detectors, combinations of both hydrophones and geophones for each receiver station 10 may be desirable, as the directional information detected by the geophones can be used in de-ghosting the pressure information detected by the hydrophones.

As illustrated in FIG. 1, receiver stations 10 are deployed in multiple lines 12 which may be substantially parallel to one another within the survey area. In this example, each line 12 includes a plurality of receiver stations 10, together with suitable conventional telemetry equipment for communication of electrical signals corresponding to the detected seismic energy. The spacing, n, between receiver lines 12, typically, is between 50 meters and 2000 meters. By way of example, in the system described herein, it will be assumed that the separation between the lines of receivers is one thousand meters. Each line 12 includes a number of receiver stations 10, and the spacing between receiver stations within a survey line might typically be 50 meters, although this spacing could vary substantially, depending on the particular survey needs. A typical length, m, of each line of detectors may be 6000 meters, but this is also subject to substantial variation, depending on geographical constraints, the survey objectives and other logistical considerations. The number of receiver lines 12 deployed for a particular survey will vary, but eight receiver lines is a typical number. The seismic sensors included in each receiver line 12 are typically included in a cable which is rolled out to configure the receiver line. However, the receiver stations may each be individually positioned at the receiver locations.

The signals detected by the seismic receivers are normally recorded for later processing. In a particular embodiment of the invention, the detected signals are transmitted along communication channels 15 extending along the length of receiver lines 12 and conveyed to a central control and recording system 14. Transmission media useful for transmitting the detected signals include, without limitation, electrical conductors, fiber optic cables and radio waves. Signals corresponding to energy detected by receiver stations 10 are communicated to central control and recording system 14 for conventional storage, and for conventional analysis such as move-out correction, common midpoint (CMP) trace gather formation, static corrections, migrations and the like. It is also been proposed in the prior art to include a recording system at each receiver station.

The invention described herein is especially useful in environmentally sensitive areas, such as the arctic region and land-marine transition zones, where vehicular traffic, especially from heavy vehicles required to transport vibrator sources, is potentially damaging to the environment, and in areas that are difficult to traverse with vehicles.

In practicing the present invention, an aircraft 16, which in one embodiment could be a helicopter, is utilized for transporting a mass unit over the survey site, and mass units are dropped from the helicopter. Because of its ability to hover over a fixed location, use of a helicopter rather than a fixed wing aircraft may be advantageous in certain situations.

In another embodiment of the invention, a fixed wing aircraft such as a Skyvan which was manufactured by Shorts Aircraft, or a C-130, manufactured by Lockheed Martin, is utilized for transporting a mass unit over the survey site. As the aircraft flies over the survey site the mass unit is dropped from the aircraft. An aircraft which has been previously adapted for carrying sky divers may be especially useful in practicing the invention. In addition to fixed wing aircraft and helicopters, other aircraft, including but not limited to dirigibles could also be used and all such delivery means are within the scope of this invention.

Normally, a plurality of such mass units will be loaded onto the aircraft, and these mass units will be dropped from the aircraft from aerial positions such that the mass units will impact the earth's surface substantially at selected locations at the survey site. The impact of the mass units on the earth's surface will generate seismic shock waves which will travel through the earth as substantially spherical wave fronts. The magnitude of the seismic energy that is generated as the mass units strike the ground increases as a function of impact velocity, and for that reason it is desirable to configure the mass units 22 into a streamlined cylindrical shape, such as the shape shown in FIG. 2, in order to maximize the impact velocity. The mass units 22 may also include fins 23 attached at one end of the mass units to increase the stability of the mass units 22 as they fall toward the earth's surface. Handles may also be added to the mass unit so that they will be easier to handle.

In one embodiment, the flight path of the aircraft as it crosses the survey site may be parallel to the direction of the receiver lines. Other flight paths, such as flight paths which are transverse to, or diagonal to the receiver lines are also within the scope of this invention. Representative flight paths, designated by numerals 18 and 19 are shown in FIG. 1. Although the specific aircraft selected for use in practicing the invention will affect the speed at which the aircraft is flown in traversing the survey site, a fixed wing aircraft might typically be flown at ground speeds within the range of 150 to 500 kilometers/hour. The spacing between the locations at which it is desired to generate a seismic signal will vary, depending on survey needs, but if mass units are dropped from an overflying aircraft flying at 300 kilometers per hour at six second intervals, the spacing between the seismic source locations 20 at which the mass units strike the earth's surface will be about 500 meters. The source locations designated by numeral 20 shown in FIG. 1 are intended to be representative, and are shown by way of example.

As stated above, helicopters may have an advantage over fixed wing aircraft as a seismic source delivery means because of the ability of a helicopter to hover over a selected location. Accordingly, greater precision may be achieved in dropping the source at desired locations. Because helicopters are more easily maneuverable than fixed wing aircraft, use of a helicopter may also afford greater flexibility in selecting successive locations for dropping the mass units. Because of the maneuverability of helicopters, the mass units may easily dropped at selected locations that do not form straight lines.

The source locations in relation to the receiver lines and receiver stations may be selected to meet the needs of a particular survey according to criteria known to those of ordinary skill in the art. The invention also permits sources to be placed in efficient patterns selected for a specific survey to reduce acquisition footprint artifacts.

After a seismic signal is generated it is necessary to wait for a "listening time" for the signal to travel down into the subsurface where the signal is reflected from subsurface interfaces and then travels back to the earth's surface where it is detected by a receiver. The required listening time may vary depending on the acoustic velocity of the subsurface and specific survey needs, but a listening time of five seconds or more would be typical.

Figure 2:
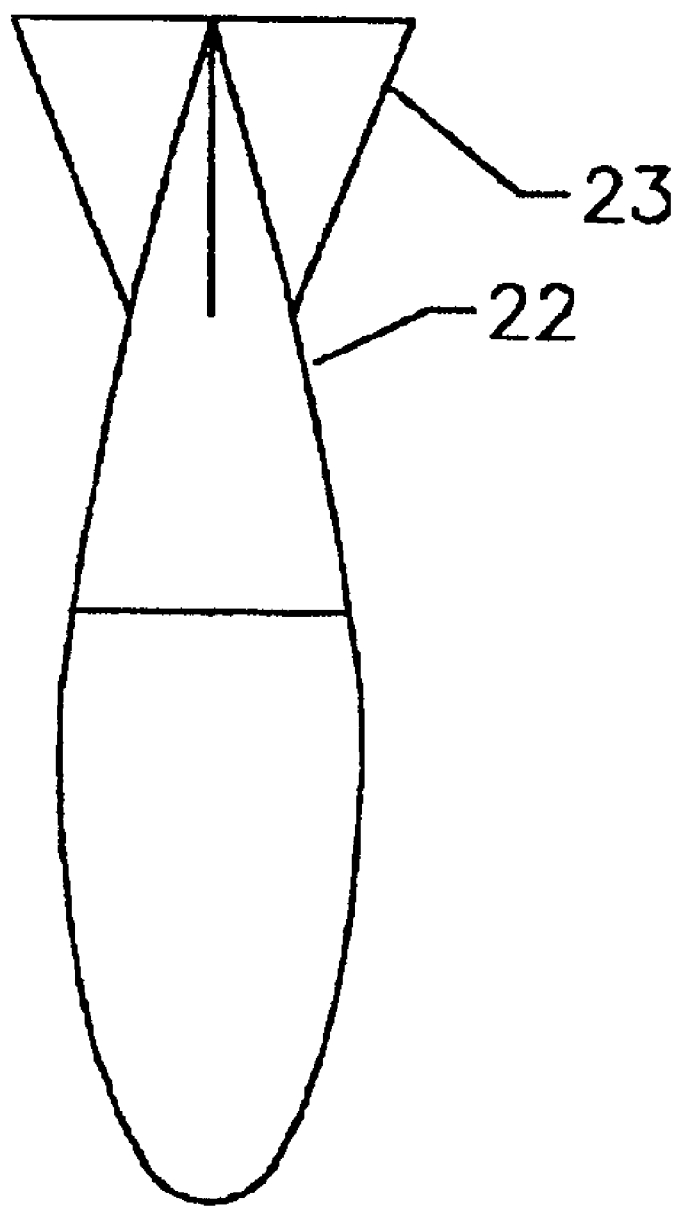
FIG. 2 shows the shape of a mass unit which is useful in practicing the invention.
Figure 5:
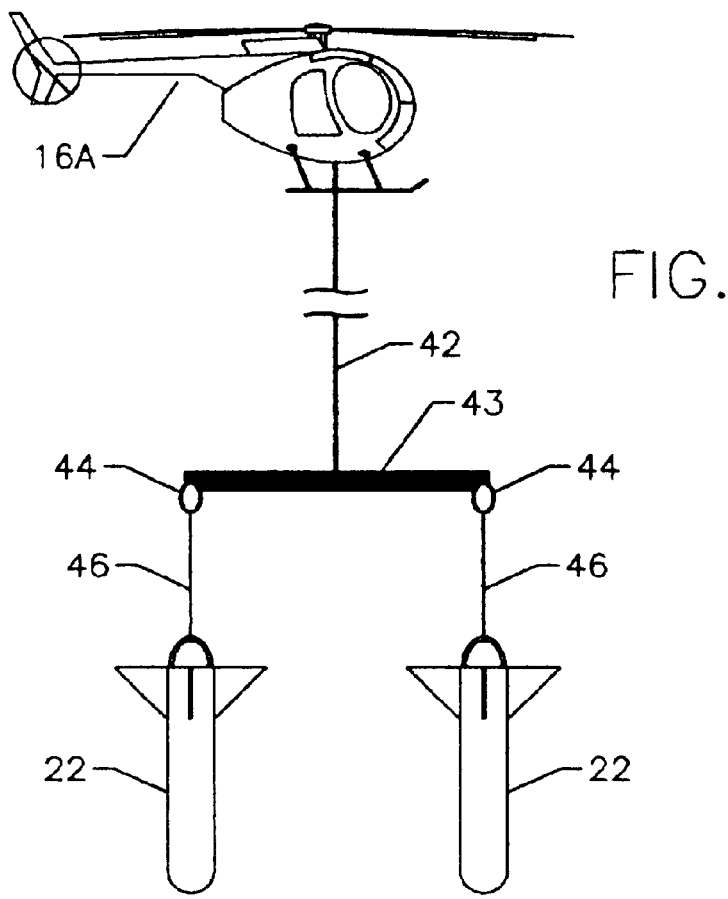
FIG. 5 shows a carousel deployed under a helicopter for transporting mass units to a survey site.
Figure 6:
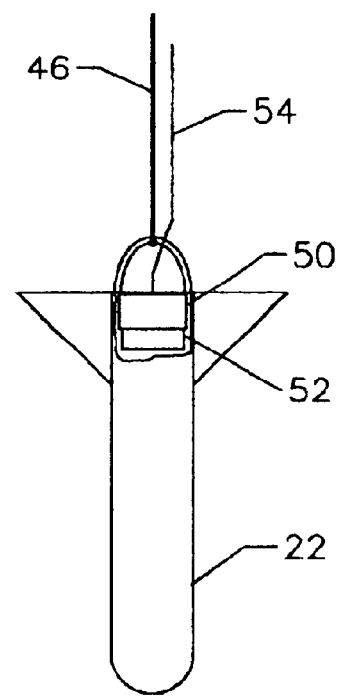
FIG. 6 shows a mass unit having an electromagnetic transmitter attached thereto.

In a particular embodiment of the invention, the mass units which are dropped from the aircraft 16 to generate the seismic signal may be concrete slugs or ice slugs which may be formed into a cylindrical, streamlined shape such as shown in FIGS. 2, 5 and 6, designated by reference numeral 22. Other materials that may be used to form the mass units include, but are not limited to, balloons filled with a liquid, such as water. Such balloons would normally be formed from an elastomeric material, and such liquid filled balloons may be especially useful for practicing the invention because of their tendency to form themselves into a streamlined shape as they fall through the atmosphere, which results in maximizing the impact velocity and the magnitude of the resulting seismic signal.

In one implementation of the invention, the mass units are transported, as shown in FIG. 5, on the underside of a helicopter 16A, on a deployment apparatus 43, which may be referred to as a sling or carousel. The deployment apparatus 43 is affixed to the underside of the helicopter by line 42. The mass units 22 may be releasably secured to hooks 44 on the deployment apparatus 43 by tethers 46. Although FIG. 5 shows only two mass units 22 being suspended from carousel 43, typically 8 to 16 mass units might be deployed from a single carousel. Preferably, the mass units 22 are remotely releasable from the hooks 44. At the location where it is desired to drop a mass unit, a mass unit is released from a hook 44 on the carousel 43.

If a fixed-wing aircraft is used for delivering the mass unit to the desired location, it is contemplated that personnel onboard the aircraft will drop the mass units from the aircraft at periodic time intervals which are selected so that the mass units will impact the earth's surface to generate seismic shock waves substantially at preselected locations.

It is also contemplated that a large container of water, or other liquid, could be carried onboard the aircraft and that equipment of the type typically used in the bottling industry could be utilized for filling elastomeric balloons on board the aircraft, as required, and that apparatus typically used by the defense industry for mechanically dropping devices from aircraft could be utilized for dropping the liquid filled balloons or other mass units from the overflying aircraft.

Personnel onboard an aircraft engaged in deploying the mass units from the aircraft will normally wear a safety harness secured to the interior of the aircraft for safety reasons.

Figure 3:
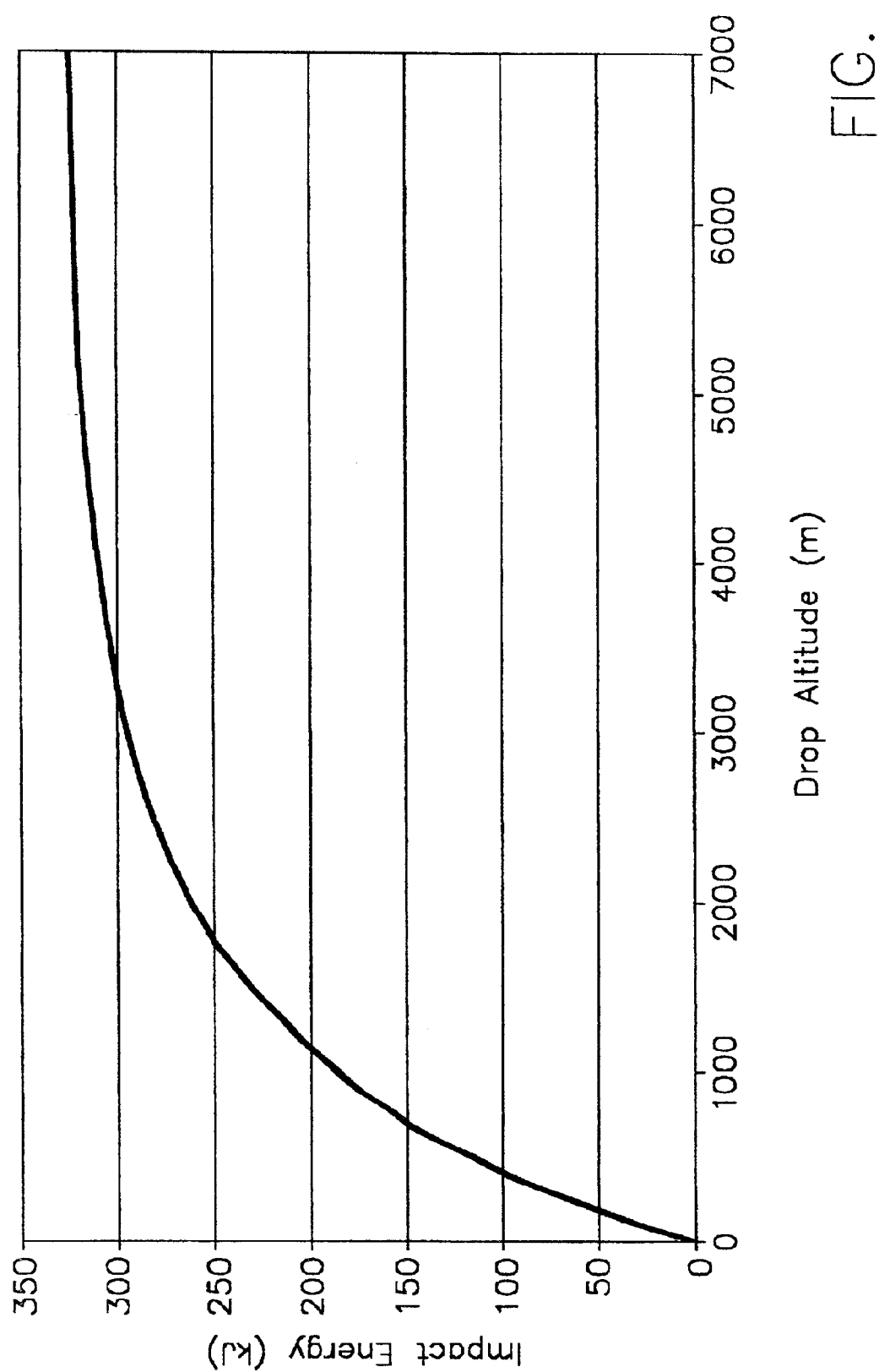
FIG. 3 shows the change in energy imparted to the earth as the height from which an object is dropped varies.

Objects dropped from an aircraft rapidly increase in velocity as they fall toward the earth. Since the impact energy of a falling object as it strikes the earth is proportional to velocity squared, the energy of a dropped object also increases rapidly as it falls toward the earth's surface. FIG. 3 shows the impact energy as a function of drop height of a thirty kilogram streamlined cylindrical mass unit having a drag coefficient of 0.7, with a diameter of 0.21 meters at standard atmospheric conditions. As shown in FIG. 3, very little increase in impact energy is realized by dropping this mass configuration from flight altitudes greater than about 4000 meters above the earth's surface because air friction will limit any increase in velocity of the falling object. At a drop height of about 2000 meters (referenced to the earth's surface at sea level), a thirty kilogram streamlined cylindrical mass will generate about 262 kiloJoules of energy upon impact. This energy is about twelve times the energy that is generated by dropping a 2000 pound (909 kilogram) weight from a height of eight feet (2.4384 meters), which is a practical configuration for weight-drop seismic sources deployed on the earth's surface.

Instruments used for detecting the seismic signal reflected from interfaces deep within the earth's subsurface need to be highly sensitive because of the need to detect very small signals that are returned to the earth's surface from such deep interfaces. These instruments are also sensitive to noise from the overflying aircraft. If the aircraft drops the mass units from an altitude too close to the earth's surface, the noise from the aircraft can significantly reduce the quality of the resulting recorded seismic signal. Further, if the aircraft drops the mass means from an altitude close to the earth's surface, the impact energy of the source is much less than if the mass is dropped from higher elevations. In one implementation of the invention, the mass unit is dropped from an altitude above ground level of at least 500 feet (152.4 meters). For drop altitudes of less than 500 feet above ground level, noise from the overflying aircraft detected by the seismic sensors will be substantial, and for the mass criteria utilized in generating FIG. 3, the impact energy will be much smaller than the impact energy achievable by dropping the mass unit from a higher altitude.

The intensity of the noise that will be present in a recorded seismic signal will vary depending on the noise generated by the delivery aircraft, and it may be helpful to perform evaluation tests for specific delivery aircraft and for particular drop altitudes. Tests have indicated that when using a helicopter results are more useful at drop altitudes greater than about 1000 feet (304.8 meters), and that the data quality was substantially improved at a drop altitudes of greater than about 2000 feet (609.6 meters) above ground level. Noise filtering of a type known to those of ordinary skill in the art may be utilized to reduce the level of the aircraft noise in the recorded seismic data.

Processing of the recorded seismic data detected by seismic sensors 10 to determine the location of subsurface reflecting interfaces and other subsurface attributes, requires knowledge of the locations of the seismic sensors 10 and the source locations 20. The seismic sensors will normally be placed manually on the ground and their locations may be precisely determined. Because of the difficulty in flying an aircraft to a precise drop point, and varying air currents which may cause the dropping mass to drift, it may be difficult to control with great precision the location at which the dropped mass unit will impact the earth's surface.

Seismic signals will be transmitted from the impact locations 20 along the earth's surface as well as into the subsurface, and the time of reception of the "first break" signal detected by at least three of the sensor stations 10 on the earth's surface may be utilized, by triangulation methods, to determine the time and location of the impact of a mass unit on the earth's surface after the mass unit is dropped from an aircraft. Triangulation methods are commonly used in marine and transition zone seismic operations, and such methods are well known to those of ordinary skill in the art. Other methods may also be utilized to determine the precise location of the impact of the mass on the earth's surface, as well as the time of impact. The impact locations may be determined from visual sightings of the impact location. In a further embodiment, as shown in FIG. 6, a transmitter 50 may be attached to a mass unit 22, which will emit an electromagnetic signal to enable the time of impact to be determined. For example, such instrument could be a radio frequency transmitter designed to transmit a signal at the time of impact, or to terminate signal transmission at the time of impact. Trailing antenna 54 is shown attached to the transmitter. The transmitted signal is detected by an electromagnetic receiver which may be included in central control and recording system 14 to enable the impact time to be determined. In one embodiment, mass units 22 are recoverable and reusable, and ruggedized transmitter units 50 are utilized, along with a shock absorbing material 52 positioned so that the shock absorbing material will be beneath the transmitter 50 as a mass units strikes the earth's surface so as to cushion the impact shock on the transmitter. Shock absorbing material may be a spring or a foam pad of a type known to those of ordinary skill in the art. This configuration is intended to enable the transmitter to survive the impact of the mass unit on the earth's surface so that the transmitter is also reusable.

Figure 4:
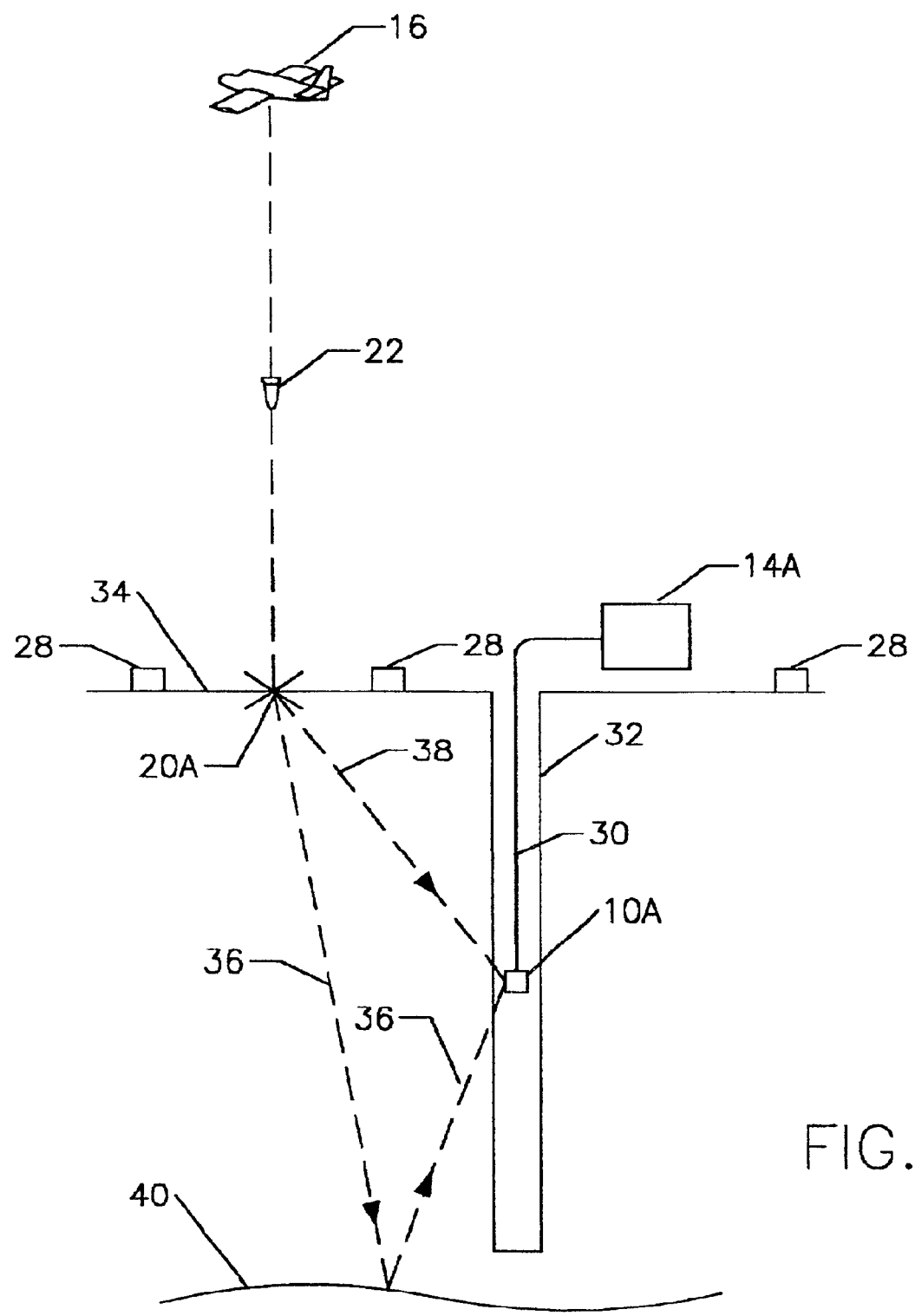
FIG. 4 shows the invention utilized for performing a vertical seismic profiling survey.

The foregoing embodiment of the invention has been described in terms of a surface seismic survey in which the seismic sensors are deployed substantially at the earth's surface. However, the invention may also be employed to perform vertical seismic profiling surveys, in which seismic sensors are deployed within a wellbore drilled into the earth's surface. FIG. 4 shows receiver stations 10A deployed by means of a wireline 30 within a wellbore 32 which has been drilled into the earth's subsurface. Aircraft 16 is flown over the survey site and drops mass units 22 onto the earth's surface 34. The resulting seismic signal travels from the impact location 20A along raypaths, such as the direct arrival raypath 38, and raypath 36 which is reflected from a subsurface reflecting interface 40, and the signals reach the location of seismic receiver stations 10A in the wellbore. Signals which are detected by senors 10A are transmitted up the wireline 30 to the earth's surface, where they are recorded by central recording and control system 14A. Sensors 28 may also be deployed on the earth's surface, and the "first break" signal detected by these surface sensors may be utilized for precisely determining, by triangulation methods known to those of ordinary skill in the art, the time and locations of the impact of the mass unit 22 on the earth's surface. An electromagnetic signal, such as described above with reference to a surface seismic survey may also be utilized to determine the time of impact of a mass on the earth's surface.

Global Positioning System receivers may also be utilized to navigate the aircraft to drop positions that have been corrected for atmospheric conditions so that the impact locations of the mass units on the earth's surface may be more precisely controlled.

It will be appreciated that various modifications and variations may be made to the invention without departing from the scope of the invention as defined in the appended claims. It is the intent to cover within the scope of the appended claims all such modifications and variations.

We claim:

1. A method for performing seismic exploration comprising:
    deploying a plurality of seismic sensors on the earth's surface at a seismic survey site;
    dropping a mass from an aircraft while said aircraft is at an elevation above said seismic survey site of greater than about 500 feet, thereby generating a seismic signal from impact of said mass on the earth's surface at said seismic survey site;
    detecting seismic signals with said plurality of seismic sensors resulting from said impact of said mass on the earth's surface; and
    applying a triangulation method to the seismic signals detected by at least three of said sensors to determine the location of the impact of said mass on the earth's surface.

2. The method of claim 1 wherein said mass is formed into a streamlined shape.

3. The method of claim 2 wherein said mass is a volume of concrete.

4. The method of claim 2 wherein said mass is a volume of ice.

5. The method of claim 1 wherein said mass assumes a streamlined shape as said mass falls through the earth's atmosphere.

6. The method of claim 5 wherein said mass is an elastomeric balloon filled with a liquid.

7. The method of claim 1 wherein said aircraft is a helicopter.

8. The method of claim 1 wherein said aircraft is a fixed-wing aircraft.

9. The method of claim 1 wherein said aircraft is a dirigible.

10. The method of claim 1 wherein said survey is a surface seismic survey.

11. The method of claim 1 wherein said survey is a vertical seismic profiling survey.

12. The method of claim 1 wherein said mass is dropped from an aircraft from an elevation above ground level of greater than about one thousand feet.

13. The method of claim 1 further comprising filtering noise from said detected seismic signals resulting from noise from said aircraft.

14. The method of claim 1 further comprising transmitting an electromagnetic signal from a transmitter attached to said mass, detecting and utilizing said transmitted electromagnetic signal to determine the time of impact of said mass unit on the earth's surface.

15. A method for performing seismic exploration, comprising:
    deploying a plurality of seismic sensors on the earth's surface at a seismic survey site;
    dropping a mass from an aircraft onto said seismic survey site, thereby generating a seismic signal from the impact of the mass on the earth's surface, said mass having an electromagnetic signal generator attached to said mass;
    transmitting an electromagnetic signal from said electromagnetic signal generator attached to said mass to indicate the time of impact of said mass on the earth's surface;
    detecting seismic signals with said seismic sensors generated by the impact of said mass on the earth's surface; and
    detecting said electromagnetic signal and utilizing said electromagnetic signal to determine the time of impact of said mass on the earth's surface.

16. The method of claim 15 wherein said mass is formed into a streamlined shape.

17. The method of claim 16 wherein said mass is a volume of concrete.

18. The method of claim 16 wherein said mass is a volume of ice.

19. The method of claim 15 wherein said mass assumes a streamlined shape as said mass falls through the earth's atmosphere.

20. The method of claim 19 wherein said mass is an elastomeric balloon filled with a liquid.

21. The method of claim 15 wherein said aircraft is a helicopter.

22. The method of claim 15 wherein said aircraft is a fixed-wing aircraft.

23. The method of claim 15 wherein said aircraft is a dirigible.

24. The method of claim 15 wherein said survey is a surface seismic survey.

25. The method of claim 15 wherein said survey is a vertical seismic profiling survey.

26. The method of claim 15 wherein said mass is dropped from an aircraft from an elevation above ground level of greater than about five hundred feet.

27. The method of claim 15 wherein said mass is dropped from an aircraft from an elevation above ground level of greater than about one thousand feet.

28. The method of claim 15 further comprising filtering noise from said detected seismic signal resulting from noise from said aircraft.

29. The method of claim 15 wherein said electromagnetic signal is transmitted from said electromagnetic signal generator as said mass falls toward the earth's surface and said electromagnetic signal is extinguished upon impact of said mass on the earth's surface, and the time of generation of said seismic signal is determined from the time at which said electromagnetic signal is extinguished.

30. The method of claim 15 wherein said electromagnetic signal is transmitted upon impact of said mass on the earth's surface, and the time of generation of said seismic signal is determined from the time of transmission of said electromagnetic signal.

* * * * *